US010769810B2

(12) United States Patent
Zhang et al.

(10) Patent No.: US 10,769,810 B2
(45) Date of Patent: *Sep. 8, 2020

(54) APPARATUS, SYSTEMS AND METHODS FOR SHADOW ASSISTED OBJECT RECOGNITION AND TRACKING

(71) Applicant: Disney Enterprises, Inc., Burbank, CA (US)

(72) Inventors: Yuecheng Zhang, Burbank, CA (US); Ilke Akin, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/577,000

(22) Filed: Sep. 20, 2019

(65) Prior Publication Data

US 2020/0013186 A1    Jan. 9, 2020

Related U.S. Application Data

(63) Continuation of application No. 15/456,987, filed on Mar. 13, 2017, now Pat. No. 10,438,370.

(60) Provisional application No. 62/350,023, filed on Jun. 14, 2016.

(51) Int. Cl.
*G06K 9/00* (2006.01)
*G06T 7/73* (2017.01)
*G06T 7/90* (2017.01)

(52) U.S. Cl.
CPC ............ *G06T 7/73* (2017.01); *G06K 9/00724* (2013.01); *G06T 7/90* (2017.01); *G06T 2207/30196* (2013.01); *G06T 2207/30221* (2013.01)

(58) Field of Classification Search
None
See application file for complete search history.

(56) References Cited

PUBLICATIONS

Zhang et al., "A tracking and predicting scheme for ping pong robot", Journal of Zhejiang University—Science C (Computers & Electronics), 12(2):110-115, 2011 (Year: 2011).*
Acosta et al. ("Ping-pong player prototype"), IEEE Robot. Autom. Mag., 10(4):44-52, 2003 (Year: 2003).*

* cited by examiner

*Primary Examiner* — Soo Jin Park
(74) *Attorney, Agent, or Firm* — Fay Kaplun & Marcin, LLP

(57) ABSTRACT

Described herein are apparatus, systems and methods for shadow assisted object recognition and tracking. The methods performed by the apparatus and system include identifying a blob within a video image, the video image having at least one object and at least one shadow of the at least one object, the at least one shadow of the at least one object cast by at least one light source. Identifying the blob includes identifying an object projection corresponding to the at least one object and a shadow projection corresponding to the at least one shadow. A location of an object portion of the at least one object is determined based on the shadow projection.

14 Claims, 14 Drawing Sheets

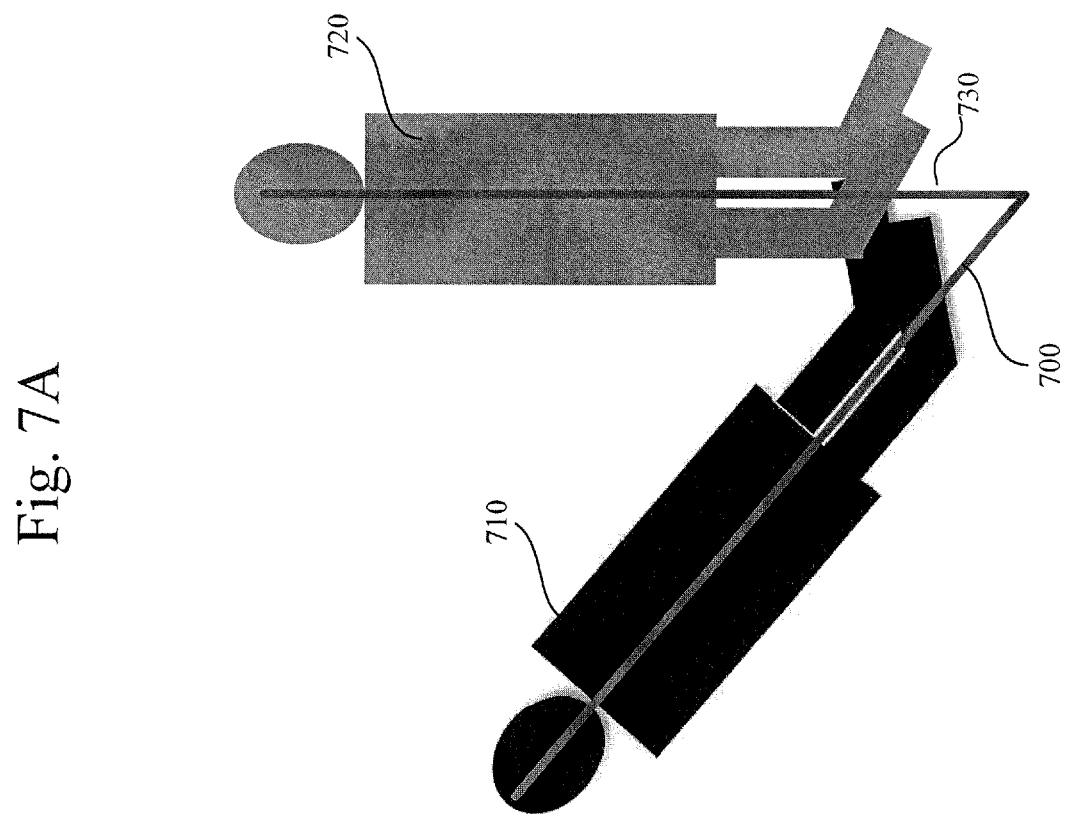

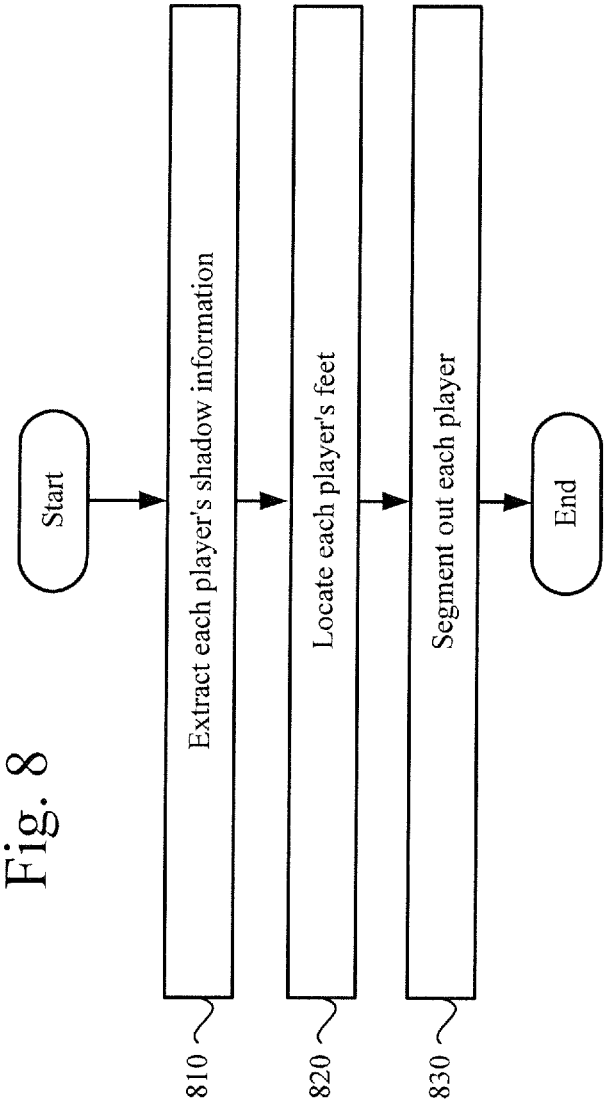

APPARATUS, SYSTEMS AND METHODS FOR SHADOW ASSISTED OBJECT RECOGNITION AND TRACKING

PRIORITY CLAIM/INCORPORATION BY REFERENCE

This application claims priority to U.S. Provisional Application 62/350,023 entitled "Shadow Assisted Object Recognition and Tracking," filed on Jun. 14, 2016, the entirety of which is incorporated herein by reference.

BACKGROUND

Video object tracking is the process of locating a moving object or multiple objects over time using one or multiple cameras. It has a variety of uses, some of which are: human-computer interaction, security and surveillance, video communication and compression, augmented reality, traffic control, medical imaging and video editing. Video object tracking can be a time consuming process due to the amount of data that is contained in video. Adding further to the complexity is the possible need to use object recognition techniques for tracking, a challenging problem in its own right.

The objective of video object tracking is to detect and then associate a target object's image projections in consecutive video frames as it changes its position. The association may be difficult when the object is moving fast relative to the frame rate or when multiple objects are being tracked. Another situation that increases the complexity of the problem is when the tracked object changes its orientation and pose over time. To address this complexity, video object tracking systems usually employ an object model which characterizes the object's appearance and motion.

Automated video object tracking applications are known in the art. Generally, such applications receive video frames as input, and act to detect objects of interest within the frame images, such as moving objects or the like, frequently using background subtraction techniques. Having detected an object within a single input frame, such applications further act to track the detected object from frame to frame, using characteristic features of the detected object. For example, establishing a track may be accomplished by detecting objects in a received input frame, determining the characteristic features of these detected objects, and, then, associating these detected objects with corresponding objects, detected in previously received input frames, based on matching characteristic features.

BRIEF DESCRIPTION OF THE DRAWINGS

FIG. 2 shows two video frame images of a single player with shadow removal function turned on.

FIG. 7A shows an example of when the object of FIG. 7 has jumped off the ground according to the exemplary embodiments discussed herein.

FIG. 8 shows an exemplary method for using shadows to segment occluded players according to the exemplary embodiments discussed herein.

DETAILED DESCRIPTION

Figure 1:
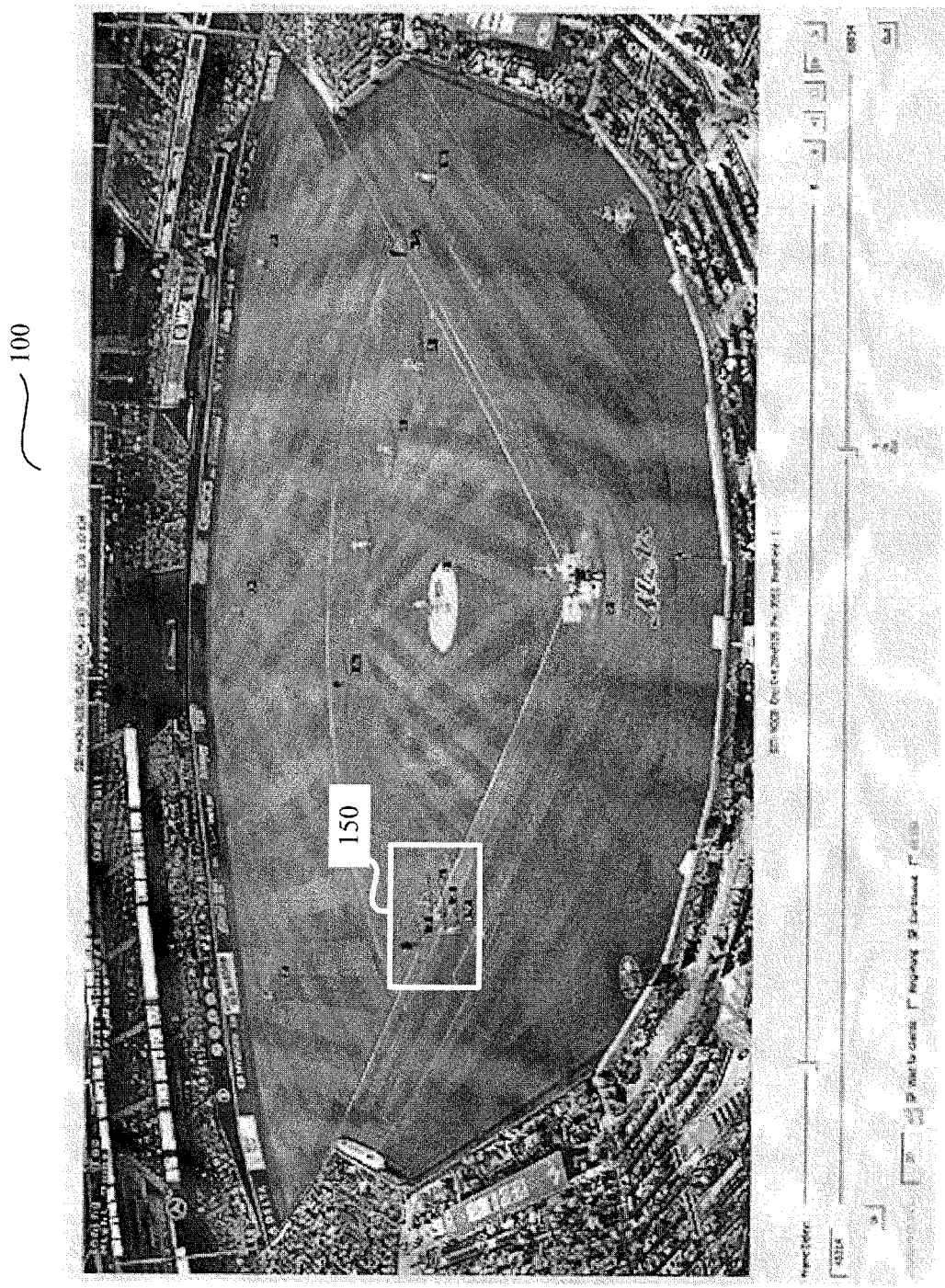
FIG. 1 shows a video frame image depicting players in a baseball game.

The exemplary embodiments may be further understood with reference to the following description and the appended drawings, wherein like elements are referred to with the same reference numerals. The exemplary embodiments describe an apparatus, system and method for shadow assisted object recognition and tracking in videos. More specifically, the exemplary systems and methods described herein may utilize information extracted out of projected images of one or more objects' shadows. Examples of the videos may include, but are not limited to, sporting events such as live broadcast performances, wherein the tracked objects include players, playing objects, vehicles, etc.

Although the exemplary systems and methods described herein may relate to structural features or methodological acts in the sports (e.g., game enhancement) domain, it is to be understood that the exemplary embodiments are not necessarily limited to the specific features or acts described. Rather, the specific features and acts are disclosed as exemplary forms of implementing the systems and methods. Modifications may readily be devised by those ordinarily skilled in the art without departing from the spirit or scope of the systems and methods described herein.

Broadcast coverage of sporting events is often accompanied by game enhancements. For instance, systems for game enhancements may utilize live recognition and tracking of players and playing objects, such as a ball, a puck, etc. In order to be able to measure live performance of players in a team game or to support augmented reality, players' three-dimensional ("3D") or real-world positional data may be extracted in real-time from the video frame images. Those skilled in the art would understand that augmented reality ("AR") may be described as a live direct or indirect view of a physical, real-world environment whose elements are augmented, or supplemented, by computer-generated sensory input such as sound, video, graphics or global positioning system ("GPS") data.

3D locations of objects in a video may be determined through video analysis of images from a single calibrated camera using known methods. These methods are not without challenges. One of the challenges in calculating 3D locations of game participating objects, including players, is occlusion. Occlusion may occur when multiple players occlude or obstruct each other or when a player self-occludes parts of his own body or the ball with respect to a viewpoint of a camera. When occlusion of objects occurs within a video, it appears in the video images as a group of connected pixels (e.g., a single amorphous shape or "blob") that is produced by the image projections of multiple players. For instance, an exemplary blob may include the connected image of multiple players where either a full image or only a part of each player's image may be shown within.

According to an exemplary embodiment, positional data of each player may be extracted at each frame, as well as any other 3D recognition information of each player (e.g., pose/positioning data). For instance, pixels that belong to each player's image may be segmented out or location of the body parts of each player may be determined within 3D space. To acquire the 3D information of one or more players or playing objects from their video image projections, exemplary embodiments may perform any number of methods, such as, but not limited to, segmentation and localization of players and their body parts even if partially occluded, extraction of 3D information of off the ground objects, etc.

As will be described in greater detail below, exemplary systems and methods may utilize the information extracted out of the projected images of one or more objects' shadows. It is noted that while the systems and methods may pertain to structural features or methodological acts in the sports domain (e.g., game enhancement), those skilled in the art would understand that the various embodiments are not limited to the specific features or acts described herein. Rather, the specific features and acts are disclosed as merely exemplary forms of implementing the systems and methods for object recognition and tracking. Accordingly, modifications may readily be devised by those ordinarily skilled in the art without departing from the spirit or scope of the systems and methods.

FIG. 1 shows a video frame image 100 depicting players in a baseball game. It is noted that along with each player's image, there are two shadow images generated by two light sources in the stadium. In the example video frame image 100, these two shadow images are generally shown as being a first shadow image on the right of each player and a second shadow image on the left of each player. In FIG. 1, there are four players located within box 150 of the video frame image 100. These players within box 150 and the use of the shadow images for these players will be described in greater detail below. It should be understood that these shadow image locations are only exemplary and are based on the location of the light source(s) in relation to the players. It is entirely possible for the shadow images to be located in a different relationship with the players depending on the location of the light source. The location of a light source, such as the lights in the stadium, may be measured using a laser distance meter.

Exemplary embodiments of systems and methods may utilize information extracted from these shadow images to assist with the computation of 3D information related to players and their body parts (e.g. players' and their body parts' location, dimension, pose, etc.). Specifically, the following will describe three exemplary use cases for the shadow images: 1) Segmentation of Players (Occluded or Non-Occluded); 2) Localization of Body Parts of Players (Occluded or Non-Occluded); and 3) Extraction of 3D Information of Off the Ground Objects. It should be noted that the use of the shadow images is not limited to these three use cases, but rather these three use cases are provided to show various techniques using shadow images to extract information from a video image.

It should be noted that in the example of FIG. 1, the shadows are created by artificial lights that are installed at the stadium and used mainly for night games. However, the shadow may also be caused by natural light such as from the sun or the moon. Thus, the number of shadows cast by a player would typically be multiple during night games (each corresponding to an artificial light present at the arena) and one during day games (from the sun). Depending on the application, exemplary embodiments may deploy sources of lights, at various locations that may be changing with time, to intentionally generate shadows of the players or objects to facilitate the systems and methods described herein. Alternatively, instead of visible light, any applicable signals may be used to cast shadows, that can be detected with a sensor, from the players or objects (e.g., using infra-red signals).

It should also be noted that in this description, the term "player(s)" may be used to denote any person that is on the field. Thus, in the example of FIG. 1, the four "players" are, in fact, two players, an umpire and a third base coach. Thus, the term player is not limited to the contestants on the opposing teams.

Localization of Body Parts of Players

Figure 2:
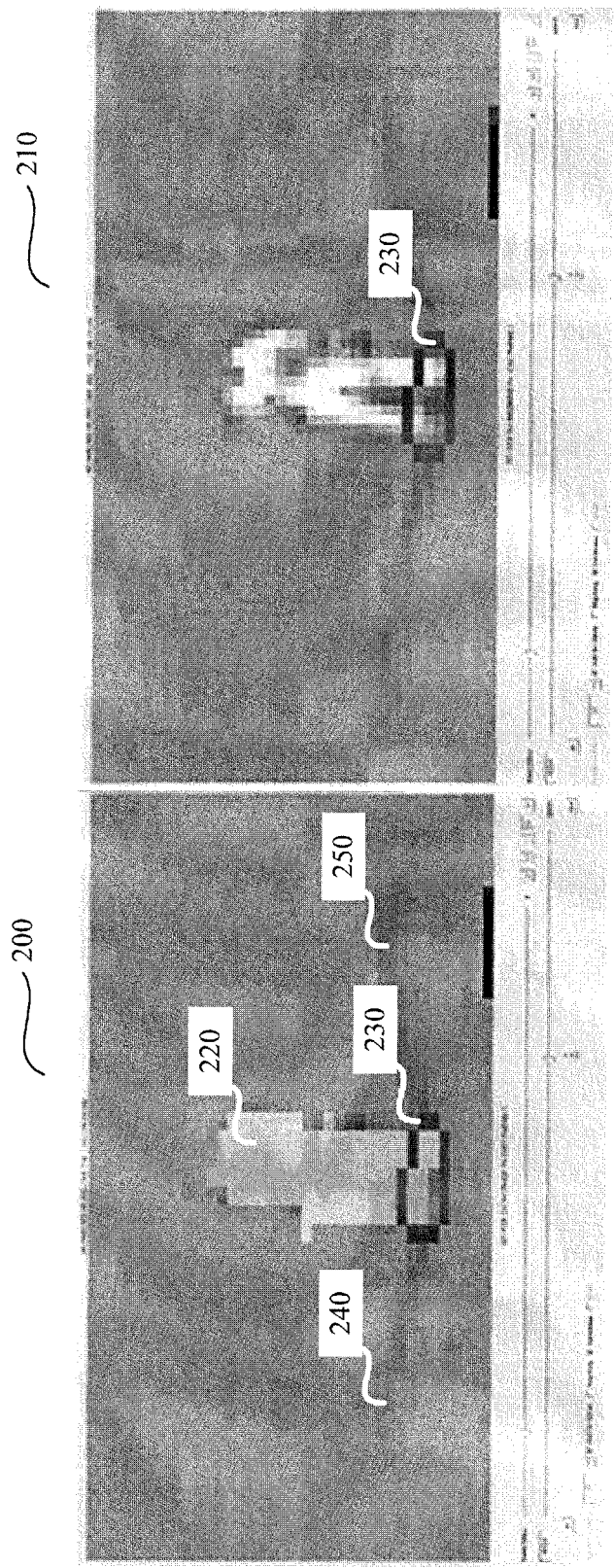

Initially, FIG. 2 shows two video frame images 200, 210 of a single player from FIG. 1 with a shadow removal function turned on. It may be considered that the player is one of the infielders shown in FIG. 1 and is standing on the dirt of the infield. The left video frame image 200 shows a blob 220 in the foreground that depicts the image region corresponding to the player. In this video frame image 200, the blob 220 does not include the player's respective shadows 240 and 250 because a shadow removal process was used to exclude the shadows 240 and 250. However, attempting to estimate the player's position without using information extracted from the player's shadows 240 and 250 may result in a position estimate that is too high, as indicated by the circle 230 (with the position estimate being at the center of the circle). As detailed in the right video frame image 210, this estimation inaccuracy may be due to the fact that the player is wearing a shoe having a similar color to the dirt on which the player is standing (e.g., pink shoes on the light red clay of the infield). If the shadow information is discarded, it may be very hard to get the correct foot location of the player. Accordingly, exemplary embodiments of the systems and methods address the problem by utilizing shadow information to improve a player's position estimation as demonstrated in this disclosure.

Figure 3:
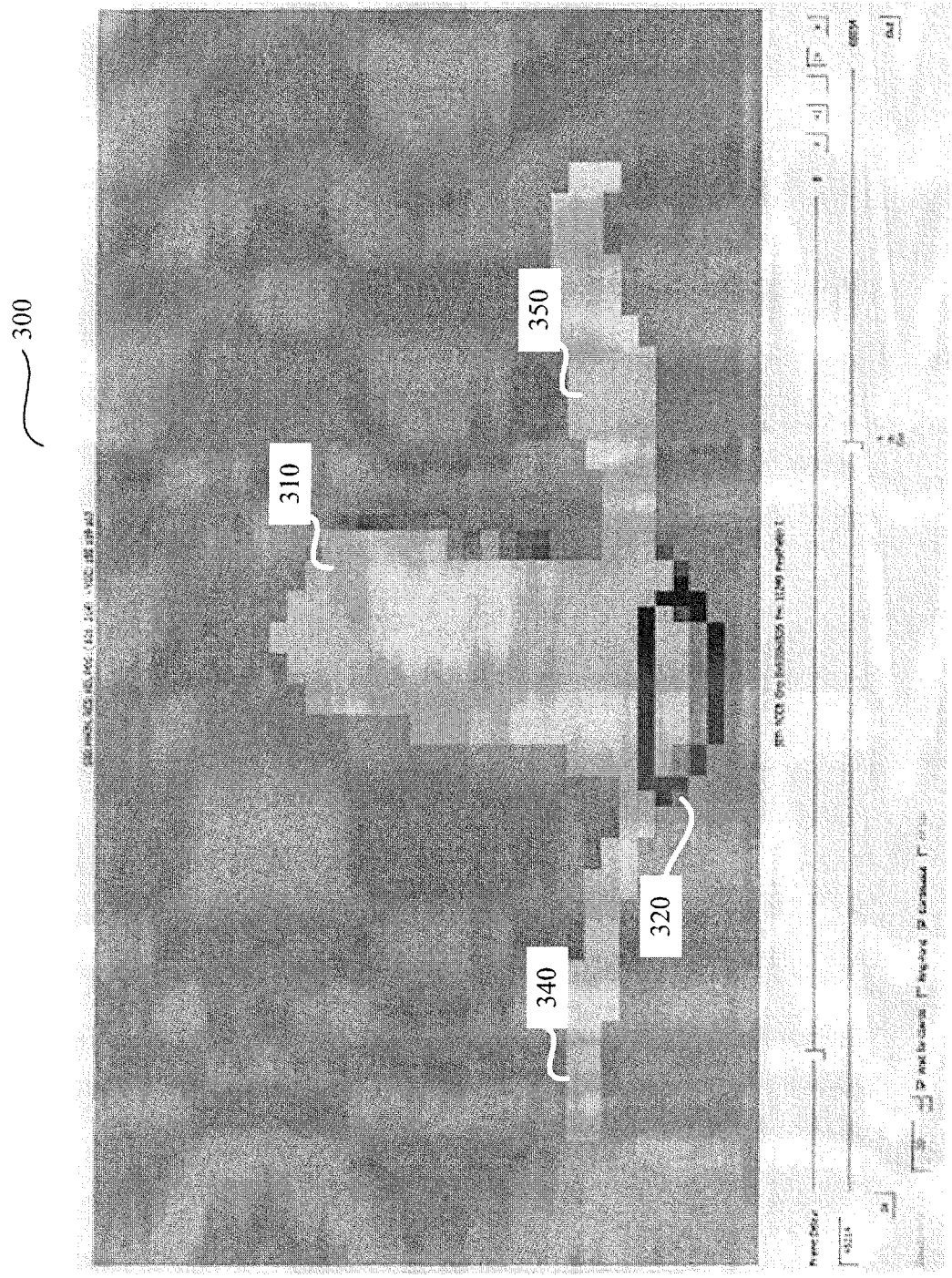
FIG. 3 shows a video frame image of a blob area including a player's image and its respective shadow image projections.

FIG. 3 shows a video frame image 300 of a blob area 310 of the same player as shown in FIG. 2 that includes the player's image and the respective shadow image projections 340 and 350. As described above, the shadow image projections 340 and 350 may be used to more accurately locate the player. However, without additional processing as described herein, when the shadow image projections 340 and 350 are not removed from the blob 310, the estimate of the player's position as indicated by the circle 320 may also not be accurate if the same processing is used as for the blob 220 as shown in FIG. 2. Accordingly, the inclusion of the shadow image projections 340 and 350 in the player's position estimation may result in a more accurate estimate for the player location 310.

Specifically, with regard to the localization of body parts of the players, the image regions of certain body parts may be recognized (e.g., detected) from both the image of the player and its corresponding shadow image based on features such as texture and shape. Furthermore, given known information, such as the camera's model and the location of the source of light, 3D information of the certain body part may be calculated by finding the intersection between the camera's projection line and the light source's projection line. Several examples of the use of a player's detected shadow to assist with localization of a player's body parts will be described below.

In a first example, it may be considered that the goal is to obtain the location of the player's feet. Again, this may refer to the player that is shown in FIGS. 2 and 3. As described above, using a standard location technique based on the blob 220 without shadow image projections or the blob 310 with shadow image projections 340 and 350 does not result in an accurate location of the player's feet. However, according to the exemplary embodiments, the intersection point of the dominant directions of the multiple shadows of the player may be used to estimate the location of the feet of the player.

Figure 4:
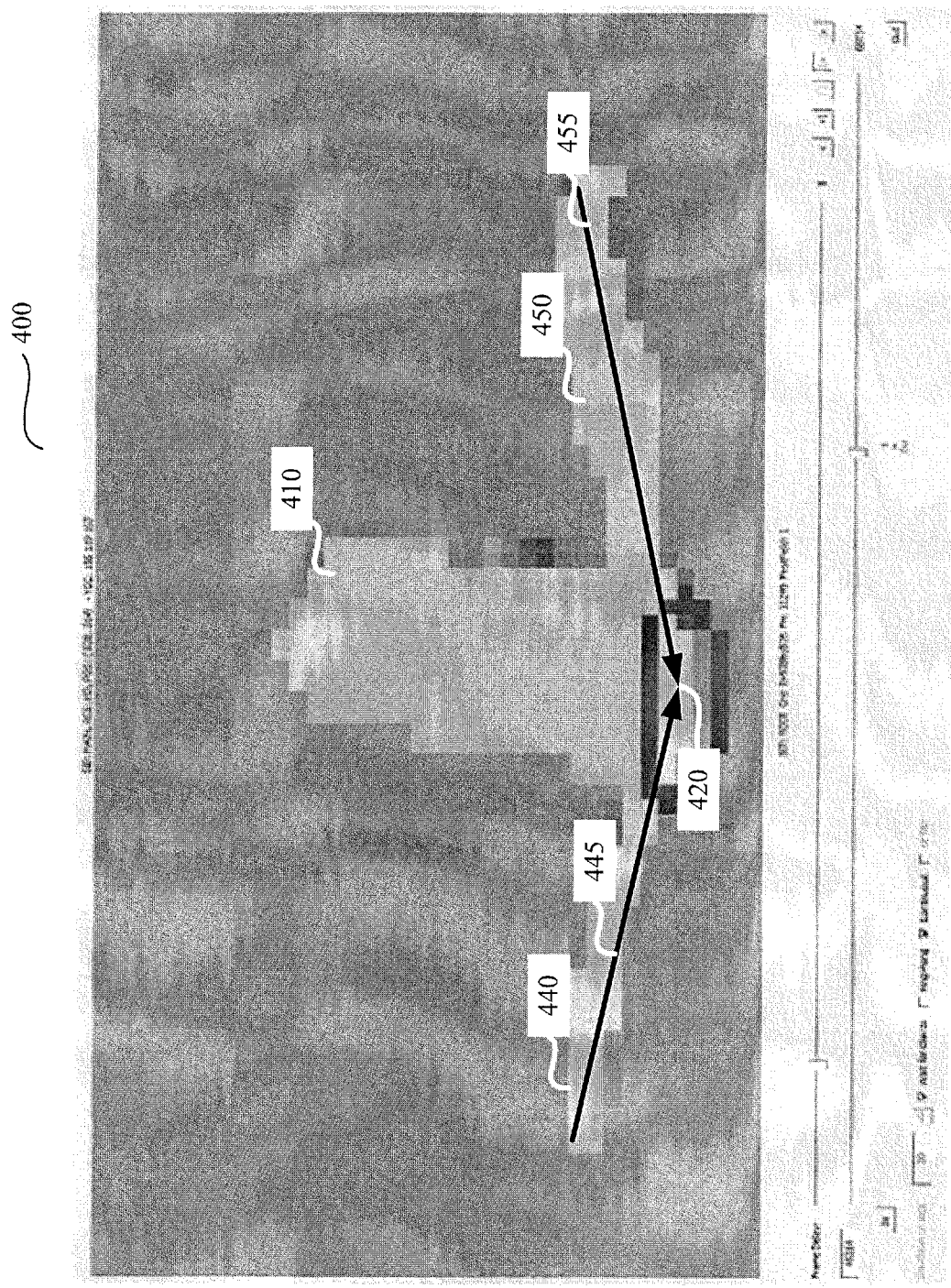
FIG. 4 shows a video frame image of a blob area including a player's image and its respective shadow image projections and lines showing the dominant directions of the shadows according to the exemplary embodiments discussed herein.

For example, FIG. 4 shows the same player as FIGS. 2 and 3 and also shows a blob 410 that includes the player's image and the respective shadow image projections 440 and 450 in the same manner as the blob 310 of FIG. 3. However, in this example, the lines 445 and 455 show the dominant directions of each of the shadows corresponding to the shadow image projections 440 and 450, respectively. In one example, the "dominant direction" may be the center line along the larger dimension of a player's shadow. However, as will be described in greater detail below, there may be other manners of selecting or defining the dominant direction of a shadow Thus, in this example, the shadow that corresponds to shadow image projection 440 is created by a light source that is to the right of the player from the perspective of a viewer of FIG. 4. Thus, the dominant direction of the shadow is towards the right of the image as shown by the arrow head on the line 445. The location and orientation of the line 445 may be based on the center line of the shadow image projection 440 and the known location of the light source within the stadium, as shown by the arrow. The line 455 for the shadow image projection 450 is formed in substantially the same manner.

As also shown in FIG. 4, the two lines 445 and 455 intersect at point 420. This intersection point 420 may be considered to be an estimate for the center location of the player's feet. This center location of the player's feet (intersection 420) may then be used in conjunction with the standard manner of determining the location of the player's feet (e.g., as shown by the location 230 in FIG. 2) to refine the estimation of the location of the player's feet. Thus, in this example, the information from two shadows created by two different light sources are used to determine the location of an object on the ground (i.e. playing surface) by first determining the object's location in the image space, as provided by intersection 420, and then determining the real-world location based on the camera model or the corresponding homography. It should be noted that the term camera information may be used to refer to the camera model or any other information concerning the camera that captures the images.

A more general definition of a shadow's dominant direction may be the principle axis of the shadow projection that is aligned with the projection of its casting light source on the same surface. For example, when the surface is the ground (i.e. playing surface), the dominant direction may be determined by fitting a line to the shadow projection using, for instance, a least-squares method, where the line's orientation may be constrained by the light source location's projection on the ground Similarly, when computing the dominant direction of the object projection, the dominant direction may be determined by fitting a line to the object projection, where the line's orientation may be constrained by the camera location's projection on the ground. However, the dominant direction of a shadow is not limited to this method of determination. In some instances, such as when the position of a light source is not exactly known, the dominant direction of one shadow projection may be constrained by those of other shadow projections in the same view. This is because all dominant directions are approximately parallel when the shadow casting light source is far enough from the objects. For example, when that light source is the sun in day games or flood lights in night games.

Figure 5:
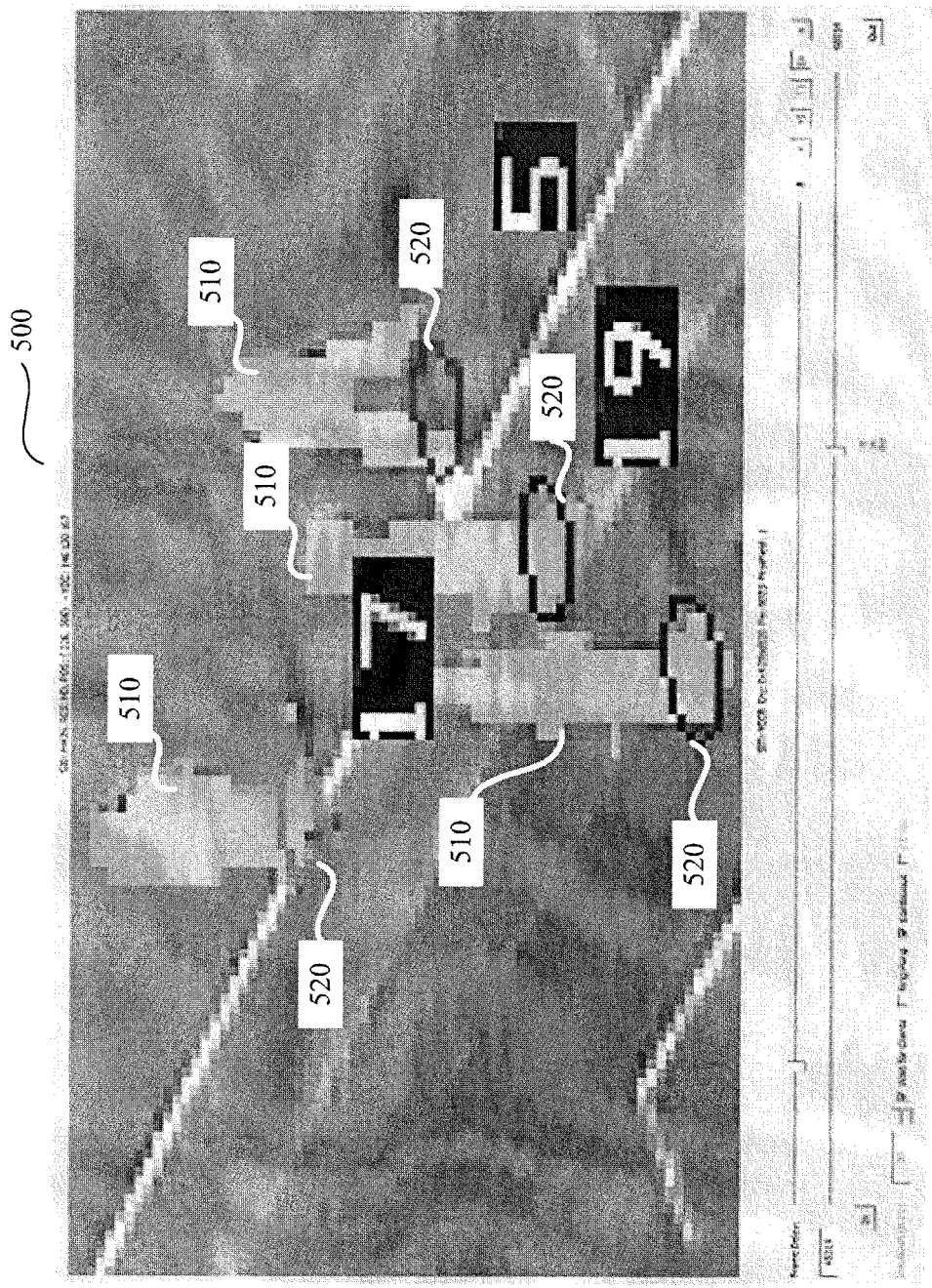
FIG. 5 shows a detailed view of the four players located within the box depicted in the video frame image of FIG. 1.

In another example that is similar to the above example, multiple shadows will be used to determine the location of the feet of multiple players. FIG. 5 shows a detailed view 500 of the four players located within box 150 of the video frame image 100 of FIG. 1. The blobs 510 in the foreground each depicts the image region corresponding to one or more players. In this detailed view 500, the blobs 510 do not include the players' respective shadows because shadow removal processing was used to exclude them. The players are separable in this image (i.e., there is little or no occlusion), and, therefore, detecting the players' 2D positions in the image is relatively straightforward. Accordingly, the players' locations are denoted by circles 520. However, accurate 3D positioning of players' feet may be a challenge due to some players' shoes that do not have distinctive features (e.g. color) relative to the ground (e.g. field colors). As described above, in the exemplary embodiments, it has been recognized that the shadows that are cast by the players or objects include or may be used as information that may be useful in more accurately locating the player or object.

Figure 6:
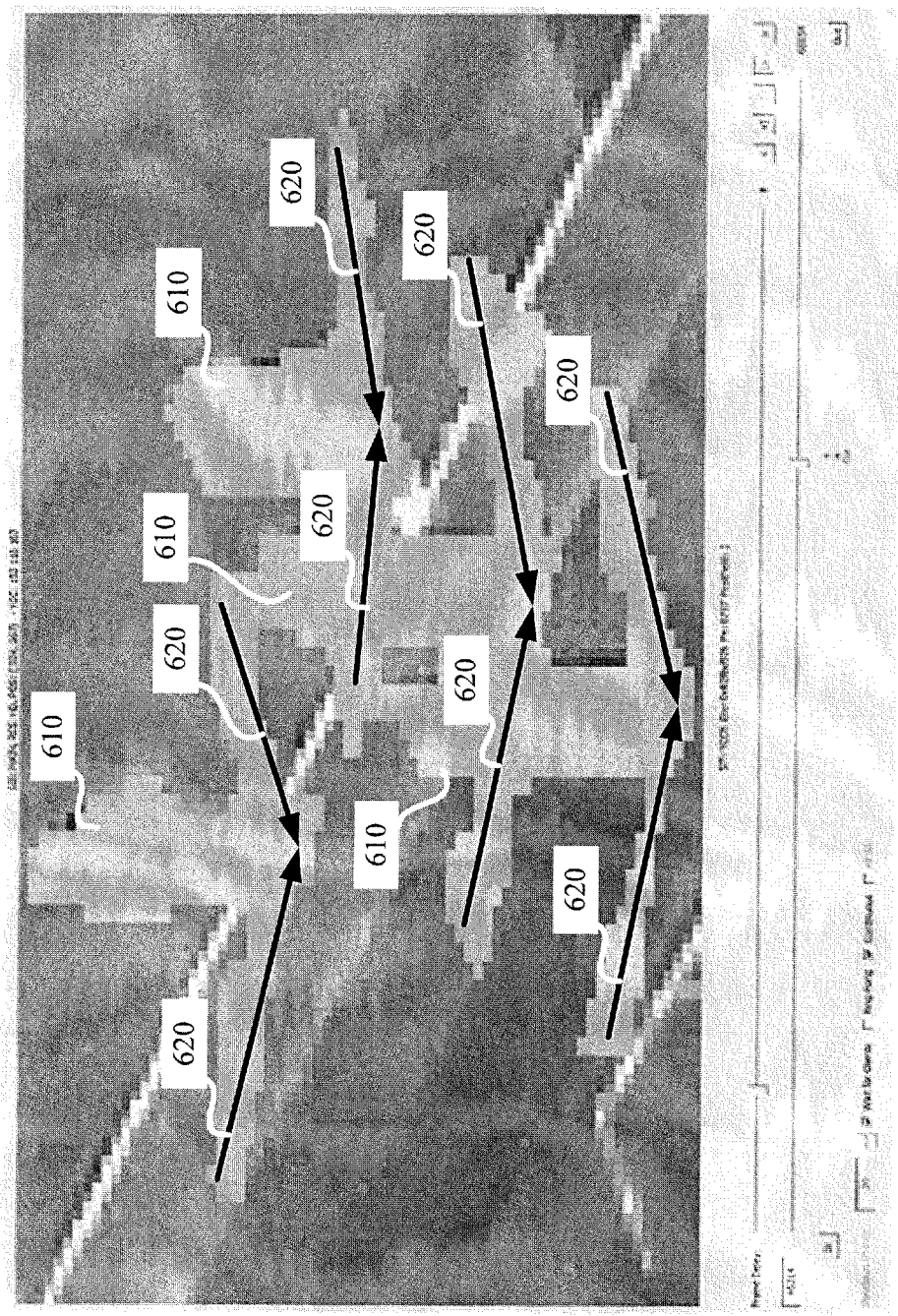
FIG. 6 shows a detailed view of the four players located within the box depicted in the video frame image of FIG. 1 wherein the blob areas of players include their casted shadows.

FIG. 6 shows a detailed view 600 of the four players located within box 150 of the video frame image 100 wherein the blob areas of players 610 includes the shadow image projections corresponding to their casted shadows. Since this is from the same video image as the above example, there are two light sources that cause shadows for each of the players and the image patterns of the shadows suggest where the 3D center position of each of the player's feet is located. Again, each of the shadow image projections for each of the players has associated with it a dominant direction line. These lines intersect at a point and this point may be considered the location of the center of the player's feet. It should be noted that this center point of the player's feet as indicated by the intersection of the lines of dominant directions may be considered to be the 3D location of the player's feet or it may also be combined with other location data to refine the 3D location of the player's feet.

It should be noted that the above example of multiple shadows for each player used the situation where each player had two shadows. However, it should be understood that the same method may be applied to situations where the player has more than two shadows from more than two light sources. For example, if there were three shadows for each player and each shadow image projection included a dominant direction line, the three lines would intersect at a point and this three-way intersection point would be the center point for the player's feet in the above examples. In another example, known algorithms can be applied to determine the best cross point if there is no unique three-way cross point, e.g. if three lines cross in a triangular way, the circumcenter of the triangle may be considered the cross point.

In a further example, the player may only have a single shadow. For example, it may be a day game where the only source of light is the sun and the player has only one discernable shadow in the image. In another example, only one artificial source of light may be used in the stadium or arena. In this situation, the center position of the feet may be the intersection point of the dominant direction of the shadow of the player and the dominant direction of the image of the player's body.

Figure 7:
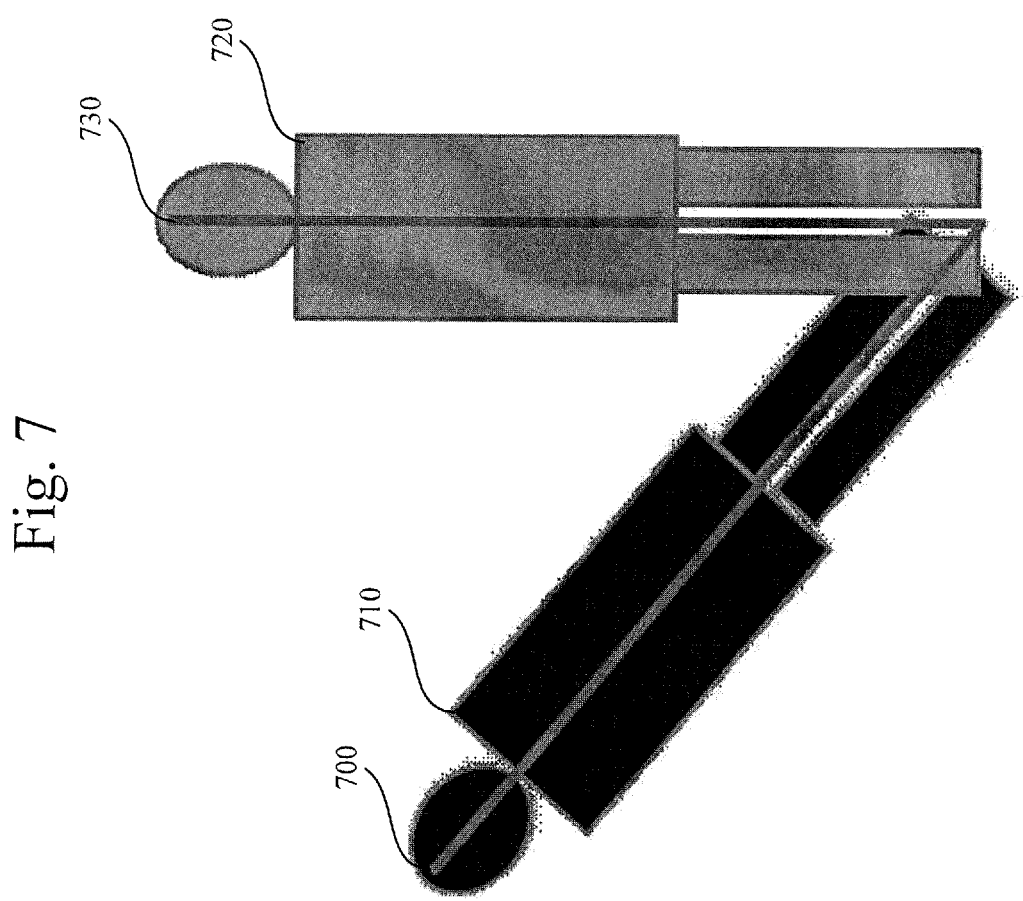
FIG. 7 shows an object having a single shadow and a location being determined for the object using the information from the single shadow according to the exemplary embodiments discussed herein.

FIG. 7 shows an object 720 having a single shadow 710 according to exemplary embodiments discussed herein. A line 700 is shown in the dominant direction as the center line along the larger dimension of a shadow's image pattern 710. A line 730 in the dominant direction of the object 720 (e.g., player) is also shown. The intersection of the line 700 of the shadow 710 and the line 730 of the object 720 may provide an accurate estimate of the position of the feet of the object 720 in the same manner as the intersection of the two lines of the shadows in the previous examples.

In addition, intersection of the lines 700 and 730 may also provide an estimate of an object's position when the object 720 is off the ground, as illustrated in FIG. 7A. FIG. 7A shows an example where the person 720 has jumped off the ground. In such a case, the line 730 and the line 700 would approximate the person's projected location on the ground.

It is noted that for objects that are close to the ground, the 3D position of the light source may not be necessary. For example, the 3D position of the light source can be used to establish the association between shadows and objects if there are multiple objects or associated shadows in the view. After this association, the shadows of the same object can be used to estimate the on-floor position of the object. If the object is on or close to the ground, the pixel groups of the shadow area should connect with (or be adjacent to) the pixel groups of the associated object area where the object touches or is close to the ground. Under this condition, the 3D position of the light source may not be necessary.

In a further example, additional embodiments of the exemplary systems and methods may estimate a player's pose. More specifically, 3D location estimates of body parts, such as, but not limited to, a player's head, shoulders, elbows, torso, knees, and feet, may be used to determine the overall player's pose. The estimation of the pose may use given or known information, such as the camera's model and the location of the source of light combined with information extracted from the body part and its shadow image regions. This information may then be used to calculate the 3D location of the body part by finding the intersection between the camera's projection line and the light source's projection line.

For example, methods for recognition may be used to locate, in the image two dimensional space, the position of a player's head-top, (Ix,Iy), and its corresponding shadow position, (Sx,Sy). These two positions, (Ix,Iy) and (Sx,Sy), may be used together with the light source's location and the camera's model to compute the 3D location of the player's head-top according to an exemplary embodiment. For example, given a calibrated camera, the S=(X,Y,Z=0) location of the head-top's shadow (Sx,Sy) may be located based on the camera's model. The projection line associated with the light source may be determined as the line passing through S and the light source's position. The projection line associated with the camera is the line passing through the camera's center and the head-top's location (Ix,Iy) on the image plane. The intersection of these two projection lines may thus provide the 3D location of the head-top.

Segmentation of Occluded Players

With regard to segmentation of occluded players, a video frame may include a large blob shape consisting of the projected images of multiple occluding players and their respective shadows. When such an exemplary blob is presented, certain parts of the blob may be identified as shadows, the systems and methods described herein may analyze the shadows and their respective causes (e.g., players or objects). Furthermore, the shadows of a group of occluding players may be separable, and thus may provide helpful information, such as the total number of players included in the blob. Through additional analyses, the shadow information may be used to facilitate the process of segmenting (i.e. partitioning) the blob into the image parts that correspond to each player. For example, if five shadows are detected, a blob segmentation process may be constrained to segment the blob into five constituent parts, each belonging to one player.

FIG. 8 shows an exemplary method 800 for using shadows to segment occluded players. The segmentation may be accomplished by, in 810, extracting each player's shadow information. As described above, the shadows of each of the occluded players may be separable. For example, as was also described above with reference to FIG. 2, there are known methods for extracting or eliminating the shadow projections from the image of a player. The process of eliminating the shadow of a player inherently identifies the shadow of the player. Thus, this inherent identification of the player's shadow can be associated with the player in 810 and this can be performed for each player.

In 820, each player's feet may be located using the shadow information extracted in 810. Exemplary manners of locating the player's feet using the shadow information has been described extensively above and any of these described methods may be used. It is also noted that in addition to the shadow information, other image information may also be used in conjunction with the shadow information to locate the player's feet. Again, this other information and its use in locating players' feet has been described above.

In 830, the location of the feet of each player may then be used to guide known segmentation methods to segment out each player. Specifically, the problem associated with the known segmentation methods is that when the location of the players' feet is not known with a high degree of accuracy, the segmentation methods have problems separating the various occluded players. However, in the present exemplary embodiments, the use of the shadow information allows for a highly accurate location of the players' feet to be determined. These accurate locations, in turn, allow for the segmentation methods (such as K-Means clustering methods) to more accurately separate the occluded players. Hence, known segmentation methods may better perform when the number of segments (e.g. players) and their relative locations in the blob to be segmented are given according to the exemplary embodiments.

Figure 9:
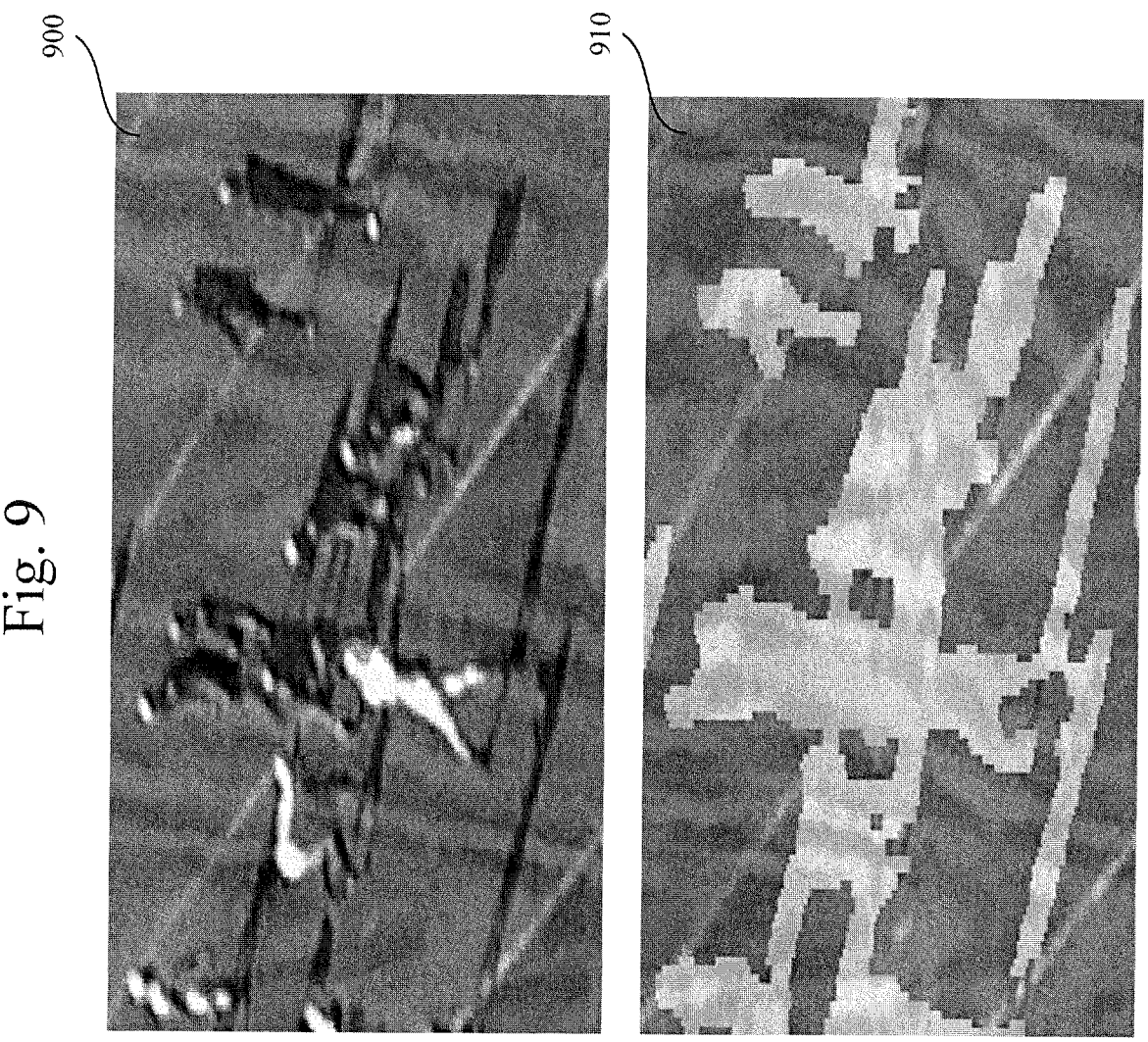
FIG. 9 shows a video image from a football game that includes players' foregrounds and their shadows, as well as its corresponding blob image.

An example of segmenting out occluded players using shadow information will be provided with reference to FIG. 9. FIG. 9 shows a video image 900 from a football game that includes players' foregrounds and their shadows. The corresponding blob image 910 shows that there is severe occlusion and this demonstrates the difficulty in segmenting each player and estimating their locations.

Figure 10:
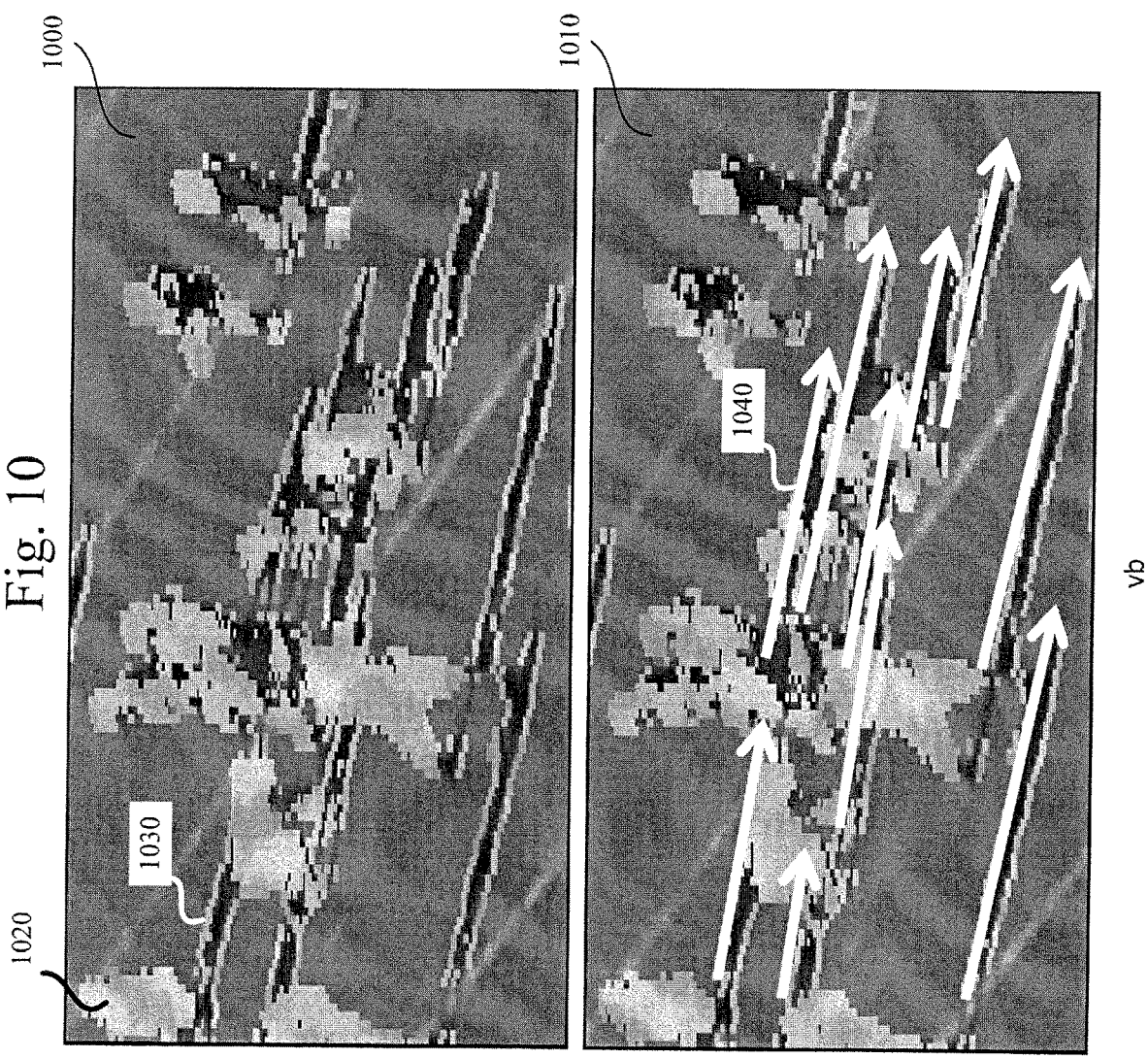
FIG. 10 shows a video image demonstrating that shadows provide valuable information with respect to how many players there are and how to separate the different players within the blob according to the exemplary embodiments discussed herein.

However, FIG. 10 shows a video image 1000 that identifies the shadow image projection of each player and the foreground image for each player, e.g., player image 1020 and shadow image projection 1030. As will be described below, the shadows provide valuable information with respect to how many players there are and how to separate the different players within the blob according to the exemplary embodiments discussed herein.

For example, if the big connected blob, shown in FIG. 9, is clustered into multiple color patches of similar color, then the different players may be segmented out by a simple shadow-to-object association. Assuming that the light source (e.g. the sun) is at infinity distance, and thus all the shadows' image patterns should point in the same direction (as indicated by the arrows 1040 in video image 1010, the individual color patches may be associated with the corresponding player (e.g., the respective owner of a shadow). Likewise, the pose can be roughly estimated based on the size, shape, or other features of the shadow. For instance, a crouching player will have a shorter shadow while a standing player will have a longer shadow.

Extraction of 3D Information of Off the Ground Objects

With regard to extraction of 3D information of "off the ground" objects, the real-world position of one or more of the light sources (e.g., arena lights, the sun, etc.) may be given or estimated based on analyses of the shadows. Accordingly, when a ball, puck, etc. casts a shadow on the ground, it is possible to estimate the 3D position of the ball, puck, etc., from a single frame of video captured by a single camera view using the detected position of the ball in the video image and the 2D position of its casted shadow on the ground. Additionally, or alternatively, using the 2D positions of two of the ball's casted shadows on the ground may also allow for the estimation of the 3D position of the ball from a single frame of video.

Figure 11:
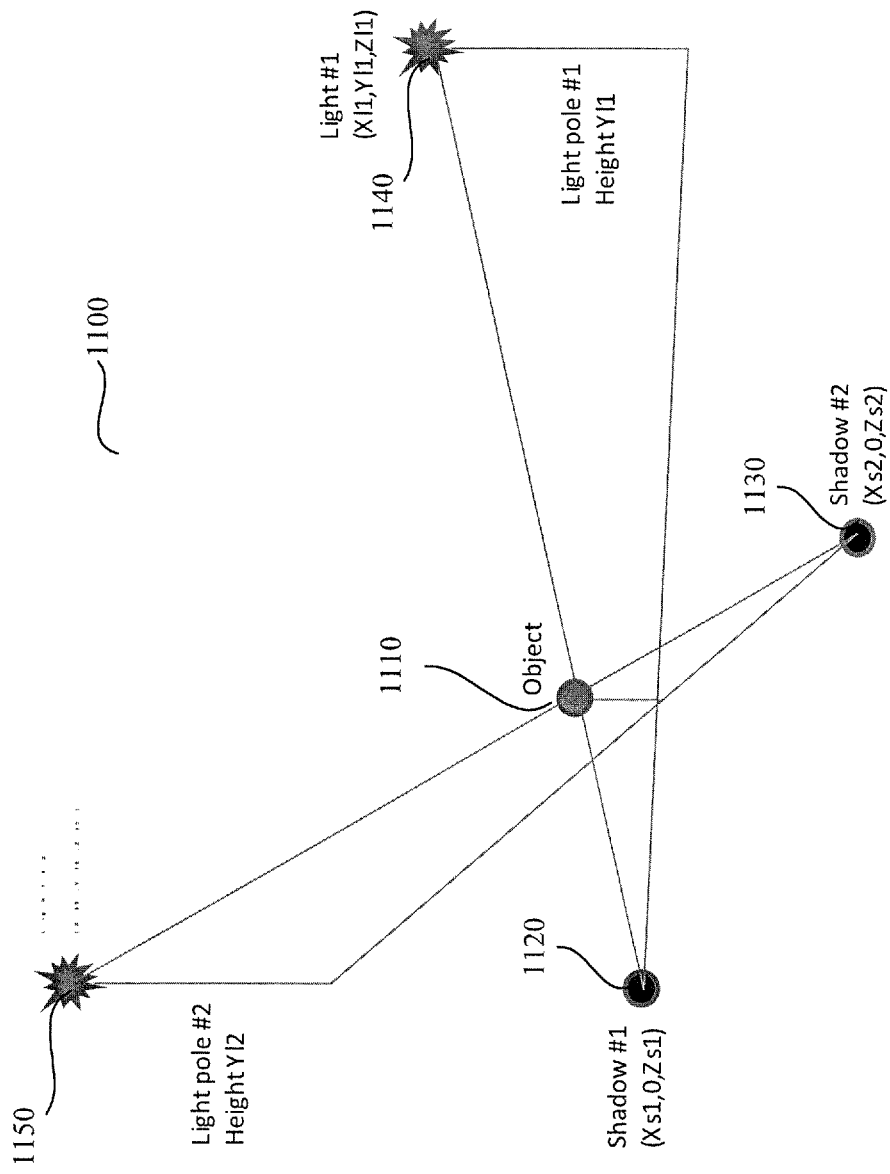
FIG. 11 shows an exemplary model using the shadow information of an off the ground object (e.g. an in air ball) to compute the 3D position of the object according to the exemplary embodiments discussed herein.

FIG. 11 shows an exemplary model 1100 using the shadow information of an off the ground object 1110 (e.g. an in-air ball) to compute the 3D position of the object 1110 according to the exemplary embodiments discussed herein. Hence, using the shadow ground positions (shadow #1 1120 and shadow #2 1130) and the light source positions (light #1 1140 and light #2 1150), the 3D position of the object 1110 may be derived through a single camera view based on the intersection between the projection lines, wherein a projection line is the line between a source of light and the respective shadow. The calculations used to compute the 3D position of the object 1110 will be apparent to those skilled in the art based on the data shown in FIG. 11.

In an exemplary embodiment where one source of light may be used to compute the object's location, the location of the object 1110 may be found based on the intersection between the projection line of one light source and the projection line of the camera (e.g., the line connecting the camera's center to the ball's image on the image plane).

Figure 12:
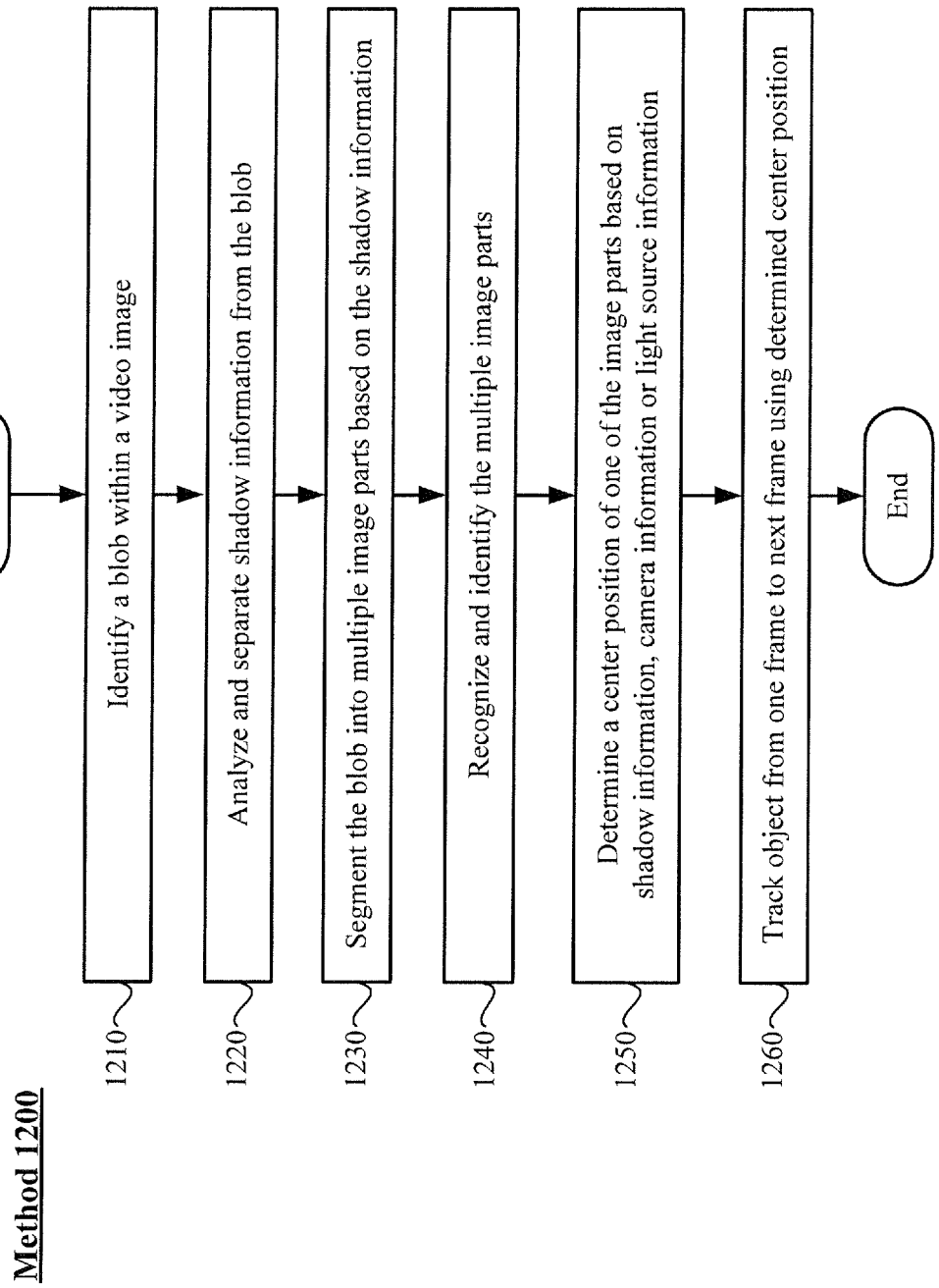
FIG. 12 shows an exemplary method for shadow assisted object recognition and tracking in videos according to the exemplary embodiments discussed herein.

FIG. 12 shows an exemplary method 1200 for shadow assisted object recognition and tracking according to the exemplary embodiments discussed herein. As each of the operations that are shown in FIG. 12 has been discussed in detail above, the description of the method 1200 will provide an overview of these operations. In addition, while it is noted that all operations described in the entirety of this description may be optional, modified or performed in a different order, it is worth noting that this is also true for the operations that are described with reference to method 1200.

Initially, in 1210, an exemplary blob may be identified within a video image, wherein the blob includes a plurality of objects and at least one shadow. For example, the blobs that are illustrated in image 600 of FIG. 6 or image 910 of FIG. 9.

In 1220, shadow information pertaining to the at least one shadow may be analyzed and separated from the blob. As described above, this separating of the shadow image information from the object information may be used to process occluded objects and it may also be used to determine object location.

In 1230, the blob may be segmented into multiple image parts based on the shadow information. This operation is specifically for the occluded object segmentation operation which is described in detail with respect to FIG. 8. If there are no occluded objects within the image, this operation does not necessarily need to be performed. In 1240, the multiple image parts identified by the segmentation may be recognized and identified.

In 1250, a center position of one of the image parts may be determined based on the shadow information. Alternatively, the position of any distinguishable points within or along the boundary of one of the image parts may be determined based on the shadow information (e.g. tip of the elbows or knees). As described above, this location determination may be based solely on the shadow information or may also be based on additional information such as the camera information and light source information. Furthermore, the locating operation may be performed for the purposes of determining the location information as an ends to itself or may also be used as a location input to the segmentation methods that are performed in 1230. Similarly to the 3D positioning of a body part center (e.g. head or feet), 3D positioning of any desired location on the player's body may be computed according to the exemplary embodiments, as long as correspondence between the desired location at the player's image and the player's shadow may be established.

In 1260, the object (e.g., the player) may be tracked from one frame to the next frame of the video based on the locations of the body parts or pose of the player that was previously determined.

Figure 13:
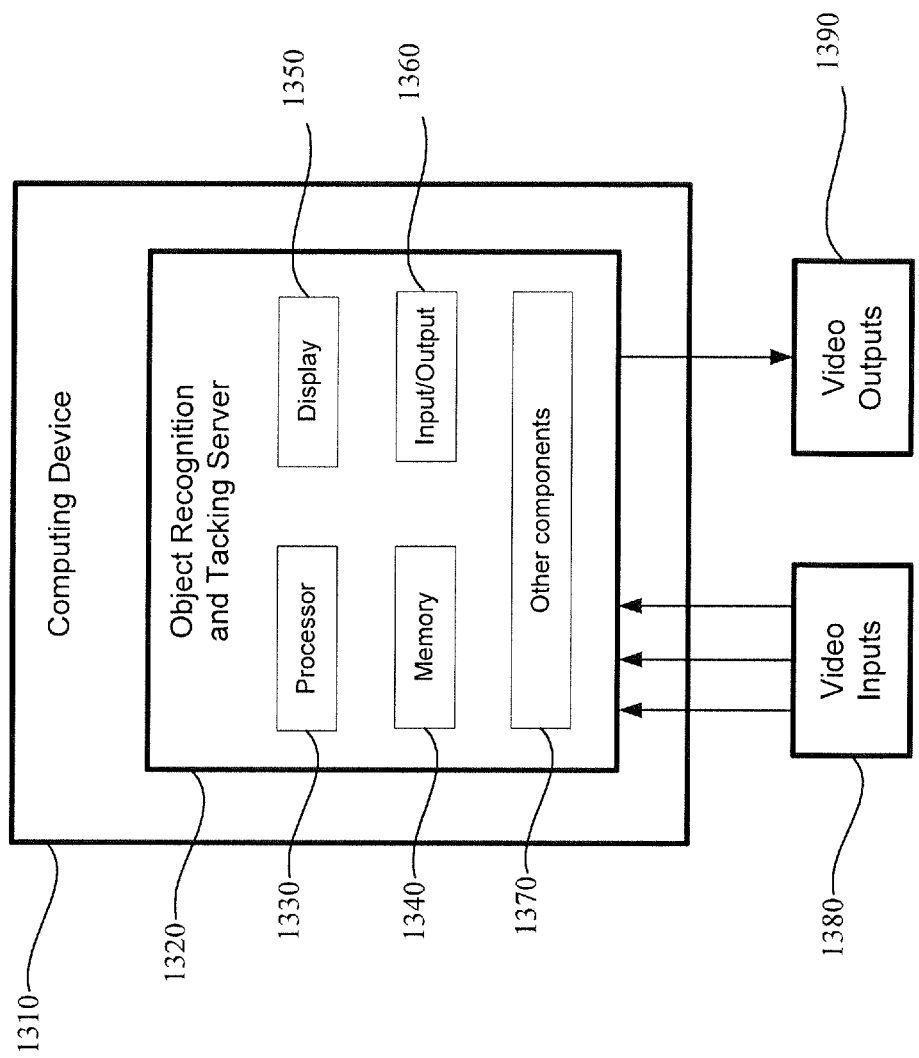
FIG. 13 shows an exemplary system for shadow assisted object recognition and tracking in videos according to the exemplary embodiments discussed herein.

FIG. 13 shows an exemplary system 1300 for shadow assisted object recognition and tracking according to the exemplary embodiments discussed herein. The system 1300 may utilize a computing device 1310 to receive an input video 1380 to generate an enhanced video output 1390. The computing device 1310 may include an exemplary object recognition and tracking server 1320 that may include a processor 1330, a memory arrangement 1340, a display device 1350, an input/output ("I/O") device 1360, and other components 1370 (e.g., an audio input device, an audio output device, a battery, a data acquisition device, ports to electrically connect to other electronic devices, etc.).

The exemplary processor 1330 may receive user input from the display 1350 or through other components of the device 1370 (e.g., keyboard, mouse, etc.). The exemplary memory 1340 may store instructions, including instructions related to the above-described software methods (e.g., method 800 of FIG. 8 or method 1200 of FIG. 12) and application (e.g., a shadow-assisted object recognition and tracking application), executable by the processor 1330. Therefore, a user of the computing device 1310 may interact with the software application stored in the memory 1340 of the computing device 1310. The processor 1330 may process these user interactions and adjust the content and modeling configurations.

It should be noted that the exemplary processor 1330 may include, for example, a single processor, a multi-processor CPU/GPU, a cloud based computation system based on multiple computing devices, etc.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   receiving a video image that includes:
      an object that is elevated with respect to ground level in the video image,
      a first shadow of the object and a second shadow of the object; and
   determining three-dimensional positional information corresponding to a location of the object based on a detected position of the object in the video image and an intersection point of i) a first direction line corresponding to the first shadow and ii) a second direction line corresponding to the second shadow.

2. The method of claim 1, further comprising:
   determining a location of a light source that casts the first shadow of the object, wherein the location of the light source is further used to determine the three-dimensional positional information.

3. The method of claim 1, wherein the first direction line is a line between the first shadow and a light source that casts the first shadow.

4. The method of claim 1, wherein the video image is from a single frame of captured video.

5. The method of claim 1, wherein the video image comprises a plurality of frames of captured video and the three-dimensional positional information is determined for each of the plurality of frames, wherein the three-dimensional positional information changes between a first one of the plurality of frames and a last one of the plurality of frames.

6. A device, comprising:
   a memory having a program stored thereon; and
   a processor coupled to the memory, wherein the processor executes the program to cause the processor to perform operations comprising:
      receiving a video image that includes:
         an object that is elevated with respect to ground level in the video image,
         a first shadow of the object, and
         a second shadow of the object; and
      determining three-dimensional positional information corresponding to a location of the object based on a detected position of the object in the video image and an intersection point of i) a first direction line corresponding to the first shadow and ii) a second direction line corresponding to the second shadow.

7. The device of claim 6, wherein the operations further comprise:
   determining a location of a light source that casts the first shadow of the object, wherein the location of the light source is further used to determine the three-dimensional positional information.

8. The device of claim 6, wherein the first direction line is a line between the first shadow and a light source that casts the first shadow.

9. The device of claim 6, wherein the video image is from one of a single frame of captured video or a plurality of frames of captured video and the three-dimensional positional information is determined for each of the plurality of frames, wherein the three-dimensional positional information changes between a first one of the plurality of frames and a last one of the plurality of frames.

10. A non-transitory computer readable storage medium comprising a plurality of instructions, that when executed by a processor cause the processor to perform operations comprising:
    receiving a video image that includes:
       an object that is elevated with respect to ground level in the video image,
       a first shadow of the object, and
       a second shadow of the object; and
    determining three-dimensional positional information corresponding to a location of the object based on a detected position of the object in the video image and an intersection point of i) a first direction line corresponding to the first shadow and ii) a second direction line corresponding to the second shadow.

11. The non-transitory computer readable storage medium of claim 10, wherein the operations further comprise:
    determining a location of a light source that casts the first shadow of the object, wherein the location of the light source is further used to determine the three-dimensional positional information.

12. The non-transitory computer readable storage medium of claim 10, wherein the first direction line is a line between the first shadow and a light source that casts the first shadow.

13. The non-transitory computer readable storage medium of claim 10, wherein the video image is from a single frame of captured video.

14. The non-transitory computer readable storage medium of claim 10, wherein the video image comprises a plurality of frames of captured video and the three-dimensional positional information is determined for each of the plurality of frames, wherein the three-dimensional positional information changes between a first one of the plurality of frames and a last one of the plurality of frames.

* * * * *